US011420192B2

(12) United States Patent
Koseoglu et al.

(10) Patent No.: US 11,420,192 B2
(45) Date of Patent: Aug. 23, 2022

(54) HYDROCRACKING CATALYSTS CONTAINING RARE EARTH CONTAINING POST-MODIFIED USY ZEOLITE, METHOD FOR PREPARING HYDROCRACKING CATALYSTS, AND METHODS FOR HYDROCRACKING HYDROCARBON OIL WITH HYDROCRACKING CATALYSTS

(71) Applicants: Saudi Arabian Oil Company, Dhahran (SA); JGC Catalysts and Chemicals, Ltd., Kawasaki (JP); Japan Cooperation Center Petroleum, Tokyo (JP)

(72) Inventors: Omer Refa Koseoglu, Dhahran (SA); Robert Peter Hodgkins, Dhahran (SA); Mitsunori Watabe, Kanagawa (JP); Koji Uchida, Kanagawa (JP)

(73) Assignees: Saudi Arabian Oil Company, Dhahran (SA); JGC Catalysts and Chemicals Ltd., Kawasaki (JP); Japan Cooperation Center Petroleum, Tokyo (JP)

( * ) Notice: Subject to any disclaimer, the term of this patent is extended or adjusted under 35 U.S.C. 154(b) by 0 days.

(21) Appl. No.: 16/940,711

(22) Filed: Jul. 28, 2020

(65) Prior Publication Data
US 2022/0032273 A1  Feb. 3, 2022

(51) Int. Cl.
| | |
|---|---|
| *B01J 29/08* | (2006.01) |
| *B01J 29/16* | (2006.01) |
| *C10G 47/18* | (2006.01) |
| *C10G 47/20* | (2006.01) |
| *B01J 21/04* | (2006.01) |
| *B01J 35/10* | (2006.01) |
| *B01J 37/00* | (2006.01) |
| *B01J 37/04* | (2006.01) |

(52) U.S. Cl.
CPC ............ *B01J 29/088* (2013.01); *B01J 21/04* (2013.01); *B01J 29/166* (2013.01); *B01J 35/1019* (2013.01); *B01J 35/1023* (2013.01); *B01J 35/1038* (2013.01); *B01J 35/1042* (2013.01); *B01J 35/1066* (2013.01); *B01J 37/0018* (2013.01); *B01J 37/04* (2013.01); *C10G 47/18* (2013.01); *C10G 47/20* (2013.01); *C10G 2300/1074* (2013.01); *C10G 2300/202* (2013.01); *C10G 2300/301* (2013.01); *C10G 2300/308* (2013.01); *C10G 2300/4018* (2013.01)

(58) Field of Classification Search
None
See application file for complete search history.

(56) References Cited

U.S. PATENT DOCUMENTS

| | | | |
|---|---|---|---|
| 3,523,914 | A | 8/1970 | Mitsche et al. |
| 3,842,138 | A | 10/1974 | Chahvekilian et al. |
| 3,944,481 | A | 3/1976 | Wing et al. |
| 4,002,556 | A | 1/1977 | Satchel |
| 4,065,379 | A | 12/1977 | Soonawala et al. |
| 4,115,467 | A | 9/1978 | Fowler |
| 4,180,453 | A | 12/1979 | Franck et al. |
| 4,210,560 | A | 7/1980 | Kehl |
| 4,255,288 | A | 3/1981 | Cull et al. |
| 4,419,271 | A | 12/1983 | Ward |
| 4,698,322 | A | 10/1987 | Santilli et al. |
| 4,738,941 | A | 4/1988 | Dufresne et al. |
| 4,798,665 | A | 1/1989 | Humbach et al. |
| 4,826,586 | A | 5/1989 | Herbst et al. |
| 4,859,308 | A | 8/1989 | Harandi et al. |
| 5,057,203 | A | 10/1991 | Chu et al. |
| 5,185,484 | A | 2/1993 | Del Rossi et al. |
| 5,192,421 | A | 3/1993 | Audeh et al. |
| 5,258,117 | A | 11/1993 | Kolstad et al. |
| 5,264,635 | A | 11/1993 | Le et al. |
| 5,271,761 | A | 12/1993 | Skeels et al. |
| 5,414,175 | A | 5/1995 | Cook |
| 5,690,810 | A | 11/1997 | Lawrence et al. |
| 5,906,728 | A | 5/1999 | Iaccino et al. |
| 6,017,840 | A | 1/2000 | Wu et al. |
| 6,063,944 | A | 5/2000 | Di Renzo et al. |
| 6,132,494 | A | 10/2000 | Kjos et al. |

(Continued)

FOREIGN PATENT DOCUMENTS

| | | |
|---|---|---|
| CA | 2041905 A1 | 11/1991 |
| CN | 101134576 A | 3/2008 |

(Continued)

OTHER PUBLICATIONS

International Search Report and Written Opinion dated Apr. 9, 2021 pertaining to International application No. PCT/US2020/060860 filed Nov. 17, 2020, 12 pgs.

(Continued)

*Primary Examiner* — Renee Robinson
(74) *Attorney, Agent, or Firm* — Dinsmore & Shohl LLP

(57) ABSTRACT

In accordance with one or more embodiments of the present disclosure, a catalyst composition includes a catalyst support and at least one hydrogenative component disposed on the catalyst support. The catalyst support includes at least one USY zeolite having a framework substituted with titanium and zirconium. The framework-substituted USY zeolite comprises at least one rare earth element. Methods of making and using such a catalyst in a hydrocracking process are also disclosed.

20 Claims, No Drawings

(56) References Cited

U.S. PATENT DOCUMENTS

| | | |
|---|---|---|
| 6,190,533 B1 | 2/2001 | Bradow et al. |
| 6,210,561 B1 | 4/2001 | Bradow et al. |
| 6,303,842 B1 | 10/2001 | Bridges et al. |
| 6,632,351 B1 | 10/2003 | Ngan et al. |
| 6,726,834 B2 | 4/2004 | Quesada et al. |
| 6,762,143 B2 | 7/2004 | Shan et al. |
| 7,084,087 B2 | 8/2006 | Shan et al. |
| 7,220,887 B2 | 5/2007 | Stell et al. |
| 7,331,746 B2 | 2/2008 | Wright et al. |
| 7,408,093 B2 | 8/2008 | Stell et al. |
| 7,550,405 B2 | 6/2009 | Shan et al. |
| 7,700,005 B2 | 4/2010 | Inui et al. |
| 7,951,745 B2 | 5/2011 | Zhou et al. |
| 7,972,498 B2 | 7/2011 | Buchanan et al. |
| 8,002,970 B2 | 8/2011 | Euzen et al. |
| 8,008,226 B2 | 8/2011 | Inui et al. |
| 8,070,938 B2 | 12/2011 | Stein et al. |
| 8,071,833 B2 | 12/2011 | Grootjans et al. |
| 8,148,285 B2 | 4/2012 | Kuroda et al. |
| 8,884,088 B2 | 11/2014 | Smith et al. |
| 9,108,190 B1 | 8/2015 | Fan et al. |
| 9,221,036 B2 | 12/2015 | Koseoglu et al. |
| 9,321,704 B2 | 4/2016 | Lattner et al. |
| 9,499,403 B2 | 11/2016 | Al-Muhaish et al. |
| 9,512,371 B2 | 12/2016 | Abe et al. |
| 9,879,187 B2 | 1/2018 | Bhan |
| 9,908,109 B2 | 3/2018 | Ravishankar et al. |
| 10,053,401 B1 | 8/2018 | Beadle et al. |
| 10,081,009 B2 | 9/2018 | Koseoglu et al. |
| 10,137,442 B2 | 11/2018 | McGuire |
| 10,293,332 B2 | 5/2019 | Koseoglu et al. |
| 10,350,585 B1 | 7/2019 | Al-Herz et al. |
| 10,427,142 B1 | 10/2019 | Al-Herz et al. |
| 10,494,574 B2 | 12/2019 | Akah et al. |
| 10,941,354 B1 | 3/2021 | Hodgkins et al. |
| 2003/0006168 A1 | 1/2003 | Ino et al. |
| 2004/0004028 A1 | 1/2004 | Stell et al. |
| 2004/0045869 A1* | 3/2004 | Benazzi ............... C10G 65/12 208/58 |
| 2004/0054247 A1 | 3/2004 | Powers |
| 2005/0209093 A1 | 9/2005 | Chester et al. |
| 2005/0232839 A1 | 10/2005 | Yaluris et al. |
| 2005/0261530 A1 | 11/2005 | Stell et al. |
| 2006/0021912 A1 | 2/2006 | Chen et al. |
| 2007/0090014 A1 | 4/2007 | Keusenkothen et al. |
| 2007/0090020 A1 | 4/2007 | Buchanan et al. |
| 2007/0232846 A1 | 10/2007 | Baumgartner et al. |
| 2009/0283443 A1 | 11/2009 | Kuroda et al. |
| 2010/0087692 A1 | 4/2010 | Koshimura et al. |
| 2011/0042269 A1 | 2/2011 | Kuechler et al. |
| 2011/0132804 A1 | 6/2011 | Stevenson et al. |
| 2011/0174682 A1 | 7/2011 | Iaccino |
| 2011/0247500 A1 | 10/2011 | Akhras et al. |
| 2011/0251049 A1 | 10/2011 | Kuroda et al. |
| 2012/0085681 A1 | 4/2012 | Abe et al. |
| 2013/0046122 A1 | 2/2013 | Vermeiren et al. |
| 2013/0066131 A1 | 3/2013 | Harris |
| 2013/0175202 A1 | 7/2013 | Koseoglu et al. |
| 2013/0299388 A1* | 11/2013 | Bulut ............... B01J 37/20 208/136 |
| 2013/0319910 A1 | 12/2013 | Koseoglu et al. |
| 2015/0111721 A1 | 4/2015 | Tian et al. |
| 2015/0111722 A1 | 4/2015 | Long et al. |
| 2015/0375218 A1 | 12/2015 | Koseoglu et al. |
| 2017/0088490 A1 | 3/2017 | Chen et al. |
| 2019/0093028 A1 | 3/2019 | Gong et al. |
| 2019/0224653 A1* | 7/2019 | Koseoglu ............... B01J 29/084 |
| 2019/0316044 A1 | 10/2019 | Koseoglu et al. |
| 2020/0055025 A1 | 2/2020 | Kukade et al. |

FOREIGN PATENT DOCUMENTS

| | | |
|---|---|---|
| CN | 101898144 A | 12/2010 |
| CN | 104549543 A | 4/2015 |
| CN | 106140289 A | 11/2016 |
| CN | 106145136 A | 11/2016 |
| EP | 703003 A1 | 3/1996 |
| EP | 2298445 A1 | 3/2011 |
| EP | 3406337 A1 | 11/2018 |
| GB | 1255544 A | 12/1971 |
| GB | 2114594 A | 8/1983 |
| JP | 58098387 A | 6/1983 |
| JP | 07308581 A | 11/1995 |
| JP | 2000334305 A | 12/2000 |
| JP | 2002255537 A | 9/2002 |
| JP | 2003226519 A | 8/2003 |
| WO | 8801254 A1 | 2/1988 |
| WO | 0104237 A2 | 1/2001 |
| WO | 2007047942 A2 | 4/2007 |
| WO | 2009088413 A1 | 7/2009 |
| WO | 2012018819 A1 | 2/2012 |
| WO | 2013057319 A2 | 4/2013 |
| WO | 2013123299 A1 | 8/2013 |
| WO | 2015179735 A1 | 11/2015 |
| WO | 2019147345 A1 | 8/2019 |

OTHER PUBLICATIONS

International Search Report and Written Opinion dated Apr. 13, 2021 pertaining to International application No. PCT/US2020/066520 filed Dec. 22, 2020, 12 pgs.
International Search Report and Written Opinion dated Apr. 21, 2021 pertaining to International application No. PCT/US2020/058208 filed Oct. 30, 2020, 12 pgs.
Notice of Allowance and Fee(s) Due dated Jun. 9, 2021 pertaining to U.S. Appl. No. 16/985,588, filed Aug. 5, 2020, 35 pages.
U.S. Office Action dated Jul. 6, 2021 pertaining to U.S. Appl. No. 16/936,990, filed Jul. 23, 2020, 35 pages.
U.S. Office Action dated Jul. 8, 2021 pertaining to U.S. Appl. No. 16/923,346, filed Jul. 8, 2020, 35 pages.
International Search Report and Written Opinion dated Mar. 17, 2021 pertaining to International application No. PCT/US2020/058682 filed Nov. 3, 2020, 16 pgs.
International Search Report pertaining to Application No. PCT/US2015/032129 dated Aug. 21, 2015.
Wang et al., "Characterization of titanium-modified USY zeolites and their catalytic performance on n-heptane cracking", Appl Catal A-Gen, vol. 214, No. 2, pp. 167-177, Jun. 29, 2001.
International Search Report pertaining to Application No. PCT/US2013/023337 dated Jun. 18, 2013.
International Search Report pertaining to Application No. PCT/US2018/064001 dated Feb. 18, 2019.
Hamdy et al., "Structural and photocatalytic properties of precious metals modified TiO2-BEA Zeolite composites", Molecular Catalysis, vol. 441, pp. 140-149, 2017.
Rakshe et al., "Acidity and m-Xylene Isomerization Activity of Large Pore, Zirconium-Containing Alumino-silicate with BEA Structure", Journal of Catalysis, vol. 188, pp. 252-260, 1999.
Reddy et al., "A Simple Method for the Preparation of Active Ti Beta Zeolite Catalysts", Catalysisby Microporous Materials, Studies int eh Surface Science and Catalysis, vol. 94, pp. 309-316, 1995.
International Search Report and Written Opinion dated Mar. 31, 2021 pertaining to International application No. PCT/US2020/057484 filed Oct. 27, 2020, 14 pgs.
U.S. Office Action dated Dec. 2, 2021 pertaining to U.S. Appl. No. 16/936,987, filed Jul. 23, 2020, 53 pages.
U.S. Notice of Allowance and Fee(s) Due dated Aug. 4, 2021 pertaining to U.S. Appl. No. 16/940,635, filed Jul. 28, 2020, 42 pages.
International Search Report and Written Opinion dated Sep. 10, 2021 pertaining to International application No. PCT/US2021/034220 filed May 26, 2021, 14 pages.
Sun, X. et al. "Synthesis of Zeolite ß and Its Performance in Catalytic Cracking", Journal of Chemical Engineering of Japan, vol. 42, No. 10, Jan. 1, 2009, pp. 760-766.
U.S. Notice of Allowance and Fee(s) Due dated Nov. 9, 2021 pertaining to U.S. Appl. No. 16/936,990, filed Jul. 23, 2020, 20 pages.

(56) References Cited

OTHER PUBLICATIONS

U.S. Notice of Allowance and Fee(s) Due dated Mar. 9, 2022 pertaining to U.S. Appl. No. 16/936,987, filed Jul. 23, 2020, 9 pages.
U.S. Office Action dated Feb. 14, 2022 pertaining to U.S. Appl. No. 16/923,346, filed Jul. 8, 2020, 22 pages.

* cited by examiner

HYDROCRACKING CATALYSTS CONTAINING RARE EARTH CONTAINING POST-MODIFIED USY ZEOLITE, METHOD FOR PREPARING HYDROCRACKING CATALYSTS, AND METHODS FOR HYDROCRACKING HYDROCARBON OIL WITH HYDROCRACKING CATALYSTS

FIELD

Embodiments of the present disclosure generally relate to hydrocracking of hydrocarbon oil, and pertain particularly to a catalyst composition for hydrocracking of hydrocarbon oil, methods of making such catalyst compositions, and methods of using such catalyst compositions.

BACKGROUND

Hydrocracking processes are used commercially in a large number of petroleum refineries to process a variety of hydrocarbon feeds boiling in the range of 370° C. to 520° C. in conventional hydrocracking units and boiling at 520° C. and above in residue hydrocracking units. In general, hydrocracking processes split the molecules of the hydrocarbon feed into smaller, i.e., lighter, molecules having higher average volatility and economic value. Additionally, hydrocracking processes typically improve the quality of the hydrocarbon feedstock by increasing the hydrogen-to-carbon ratio and by removing organosulfur and organonitrogen compounds. The hydrocracking catalyst is a key feature of hydrocracking process technologies.

Two types of catalysts used in hydrocracking: pretreat catalysts and cracking catalysts. Pretreat catalysts are designed to remove contaminants, such as sulfur and nitrogen, from the heavy hydrocarbon oil. Cracking catalysts are designed to split low-value heavy molecules into higher value transportation fuels. The cracking catalysts are typically composed of active phase metals for hydrogenation, amorphous support as a binder, and zeolites as a cracking component. Active phase metals typically include nickel, molybdenum, and tungsten. Exemplary zeolites include ultra-stable Y-type zeolites (USY zeolites).

SUMMARY

There is a continual need for more effective hydrocracking catalyst compositions. It has been discovered that a catalyst composition including at least one titanium and zirconium framework-substituted ultra-stable Y-type (hereinafter "USY") zeolite with at least one rare earth element disposed thereon may greatly enhance the effectiveness of hydrocracking processes.

According to embodiments, a catalyst composition includes a catalyst support comprising at least one framework-substituted USY zeolite and at least one hydrogenative component disposed on the catalyst support. The framework-substituted USY zeolite is substituted with zirconium atoms and titanium atoms and comprises at least one rare earth element.

According to embodiments, a method of making a catalyst composition includes heating an ultra-stable Y-type (USY) zeolite in an oven having a temperature from 500° C. to 700° C.; mixing a zirconium compound and a titanium compound with the ultra-stable Y-type (USY) zeolite to produce a framework-substituted USY zeolite; and incorporating a rare earth element into the framework-substituted USY zeolite.

According to embodiments, a method for hydrocracking hydrocarbon oil includes contacting at least one hydrocarbon oil stream with at least one hydrocracking catalyst composition and hydrogen in a reactor in order to hydrocrack the hydrocarbon oil stream. The catalyst composition includes a catalyst support comprising at least one framework-substituted USY zeolite and at least one hydrogenative component disposed on the catalyst support. The framework-substituted USY zeolite is substituted with zirconium atoms and titanium atoms and comprises at least one rare earth element.

Additional features and advantages of the embodiments described herein will be set forth in the detailed description which follows, and in part will be readily apparent to those skilled in the art from that description or recognized by practicing the embodiments described, including the detailed description and the claims which are provided infra.

DETAILED DESCRIPTION

In embodiments, a catalyst composition includes a catalyst support and at least one hydrogenative component disposed on the catalyst support. The catalyst support includes at least one USY zeolite having a framework substituted with titanium and zirconium (hereinafter "TiZr-USY zeolite"). The TiZr-USY zeolite includes at least one rare earth element. Embodiments will now be described in further detail.

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), deasphalted oil (DAO) obtained from a solvent deasphalting process, demetallized oil (DMO), light and/or heavy coker gas oil obtained from a coker process, cycle oil obtained from a fluid catalytic cracking (FCC) process, and gas oil obtained from a visbreaking process.

As used herein, the term "hydrocarbon" refers to a chemical compound composed entirely of carbon and hydrogen atoms.

As used herein, the term "crystal lattice constant" refers to a physical dimension of unit cells in a crystal lattice. The crystal lattice constant can be determined by ASTM D3942-03, entitled "Standard Test Method for Determination of the Unit Cell Dimension of a Faujasite-Type Zeolite," the entire content of which is incorporated herein by reference.

As used herein, the term "specific surface area" refers to the total surface area of the zeolite or catalyst per unit of mass. The specific surface area can be determined by ASTM D3663-03, entitled "Standard Test Method for Surface Area of Catalysts and Catalyst Carriers," the entire content of which is incorporated herein by reference. Alternatively, the specific surface area may be determined using the Brunauer-Emmett-Teller ("BET") model. Alternatively, the specific surface area can be determined by ASTM D4365-19, entitled "Standard Test Method for Determining Micropore Volume and Zeolite Area of a Catalyst," the entire content of which is incorporated herein by reference.

As used herein, the term "hydrogen/oil ratio" or "hydrogen-to-oil ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed using standard flow meters.

As used herein, the term "liquid hourly space velocity" or "LHSV" refers to the ratio of the liquid flow rate of the hydrocarbon feed to the catalyst volume or mass.

As used herein, the term "activity of the catalyst" or "catalytic activity" refers to the increase in the rate of the hydrocracking process due to the presence of the catalyst and may be approximated by the temperature at which 50% conversion of the feedstock is converted. A more highly active catalyst will have a lower such temperature.

In one aspect, a catalyst composition may include a catalyst support and at least one hydrogenative component. In embodiments, the catalyst composition may comprise from 60 wt. % to 99.99 wt. % support. For example, the catalyst composition may comprise from 65 wt. % to 95 wt. %, from 60 wt. % to 90 wt. %, from 65 wt. % to 85 wt. %, or even from 70 wt. % to 80 wt. % support. It should be understood that the catalyst composition may comprise an amount of the support in a range formed from any of the lower bounds for such a range described herein to any of the upper bounds for such a range described herein. In embodiments, the catalyst composition may comprise from 0.01 wt. % to 40 wt. % hydrogenative component. For example, the catalyst composition may comprise from 1 wt. % to 40 wt. %, from 5 wt. % to 35 wt. %, from 10 wt. % to 30 wt. %, or even from 15 wt. % to 25 wt. % hydrogenative component. It should be understood that the catalyst composition may comprise an amount of the hydrogenative component in a range formed from any of the lower bounds for such a range described herein to any of the upper bounds for such a range described herein. Without intending to be bound by any particular theory, it is believed that hydrogenation metal dispersion on the catalyst is not optimum when the amount of hydrogenative component in the catalyst composition is too large relative to the amount of support. For example, the hydrogenation metal may agglomerate on the support when the catalyst composition comprises more than 40 wt. % hydrogenative component.

The catalyst support may include at least one USY zeolite, which may have a framework substituted with titanium and zirconium. In embodiments, the catalyst support may include from 0.1 wt. % to 90 wt. % TiZr-USY zeolite. For example, the catalyst support may comprise from 0.1 wt. % to 85 wt. %, from 5 wt. % to 80 wt. %, from 10 wt. % to 75 wt. %, from 15 wt. % to 70 wt. %, from 20 wt. % to 65 wt. %, from 25 wt. % to 60 wt. %, from 30 wt. % to 55 wt. %, from 35 wt. % to 50 wt. %, or even from 40 wt. % to 45 wt. % TiZr-USY zeolite. It should be understood that the catalyst support may comprise an amount of the TiZr-USY zeolite in a range formed from any of the lower bounds for such a range described herein to any of the upper bounds for such a range described herein. Without intending to be bound by any particular theory, it is believed that if the amount of zeolite in the catalyst support is above 90 wt. %, processing the catalyst into the form of a pellet may be difficult.

In embodiments, the framework substitution may be accomplished by a post-modification process in which the zeolite is subjected to dealumination followed by insertion of transition metals, such as Ti and/or Zr. As a result, a zeolite that has been framework-substituted with titanium and zirconium may have a greater silica-to-alumina ratio (hereinafter "SAR") relative to the unsubstituted zeolite. Without intending to be bound by any particular theory, it is believed that this post-modification generates mesoporosity, which imbues the zeolite with the ability to accept large molecules inside the pores. Also, this post-modification process is believed to increase the number of medium-strength acid sites while decreasing the number of strong acid sites and to enhance the dispersion of the hydrogenative metal on the catalyst surface. Additionally, without intending to be bound by any particular theory, the post-modification may aid in the dispersion of the active phase metal of the catalyst composition.

In embodiments, post-modification of the USY zeolite may be accomplished by the following process. The zeolite may be placed in a suspension in a liquid, such that the ratio of the mass of the liquid to the solid zeolite is from 5 to 15. An inorganic acid or organic acid may be added to the suspension so that the suspension has a pH of less than 2. At least one zirconium compound and at least one titanium compound are added to this acidic suspension, which is then mixed and neutralized to secure the post-modified catalyst. An exemplary process for preparing a USY zeolite framework substituted with titanium and zirconium is described in U.S. Pat. No. 10,293,332, the entire content of which is incorporated herein by reference. Framework substitution may be monitored, for example, by ultraviolet, visible, and near-infrared spectrophotometry (UV-Vis-NIR or UV-vis), Fourier transform infrared spectroscopy (FT-IR), or nuclear magnetic resonance spectrometry (NMR).

In embodiments, the USY zeolite may be independently substituted with from 0.1 wt. % to 5 wt. % zirconium and from 0.1 wt. % to 5 wt. % titanium, in both instances calculated on an oxide basis. For instance, the USY zeolite may be independently substituted with from 0.5 wt. % to 4.5 wt. % zirconium and from 0.5 wt. % to 4.5 wt. % titanium, from 0.5 wt. % to 4 wt. % zirconium and from 0.5 wt. % to 4 wt. % titanium, from 0.5 wt. % to 3.5 wt. % zirconium and from 0.5 wt. % to 3.5 wt. % titanium, from 0.5 wt. % to 3 wt. % zirconium and from 0.5 wt. % to 3 wt. % titanium, from 0.5 wt. % to 2.5 wt. % zirconium and from 0.5 wt. % to 2.5 wt. % titanium, from 0.5 wt. % to 2 wt. % zirconium and from 0.5 wt. % to 2 wt. % titanium, from 0.5 wt. % to 1.5 wt. % zirconium and from 0.5 wt. % to 1.5 wt. % titanium, from 0.5 wt. % to 1 wt. % zirconium and from 0.5 wt. % to 1 wt. % titanium, from 1 wt. % to 4 wt. % zirconium and from 1 wt. % to 4 wt. % titanium, from 1 wt. % to 3.5 wt. % zirconium and from 1 wt. % to 3.5 wt. % titanium, from 1 wt. % to 3 wt. % zirconium and from 1 wt. % to 3 wt. % titanium, from 1 wt. % to 2.5 wt. % zirconium and from 1 wt. % to 2.5 wt. % titanium, and even from 1 wt. % to 2 wt. % zirconium and from 1 wt. % to 2 wt. % titanium. It should be understood that any amount of zirconium-substitution described herein can be used in conjunction with any amount of titanium-substitution described herein. Further, it should be understood that the range of either zirconium or titanium substitution may be formed from any of the lower bounds of such substitution described herein and any of the upper bounds of such substitution described herein.

Without intending to be bound by any particular theory, it is believed the addition of the zirconium compound and/or the titanium compound at an amount of less than 0.1 wt. % fails to improve the solid acid properties of the zeolite. Conversely, the addition of the zirconium compound and/or the titanium compound in an amount exceeding 5 wt. % does not improve the zeolite activity further and may create an unnecessary increase in cost of the resulting catalyst.

In embodiments, the TiZr-USY zeolite may have a crystal lattice constant from 2.43 nm to 2.45 nm. For example, the crystal lattice constant of the TiZr-USY zeolite may be from 2.43 nm to 2.449 nm, from 2.43 nm to 2.448 nm, from 2.43 nm to 2.447 nm, from 2.43 nm to 2.446 nm, from 2.43 nm to 2.445 nm, from 2.431 nm to 2.45 nm, from 2.432 nm to 2.45 nm, from 2.433 nm to 2.45 nm, from 2.434 nm to 2.45 nm, or even from 2.435 nm to 2.45 nm. It should be understood that the crystal lattice constant of the TiZr-USY zeolite may be in a range formed from any one of the lower bounds for such crystal lattice constant described herein to any one of the upper bounds for such crystal lattice constant described herein.

Without intending to be bound by any particular theory, it is believed that a crystal lattice constant for the TiZr-USY zeolite of less than 2.43 nm may result in a reduction in the activity of the ultimately formed hydrocracking catalyst. Such reduction is believed to be the result of a high $SiO_2/Al_2O_3$ molar ratio in the framework structure of the zeolite and a small number of solid acid sites serving as active sites for the decomposition of hydrocarbons. Conversely, a crystal lattice constant for the TiZr-USY zeolite exceeding 2.45 nm may result in breakage of the crystal structure of the TiZr-USY zeolite during a hydrocracking reaction because of a low heat resistance of the TiZr-USY zeolite. The breakage of the crystal structure of the TiZr-USY zeolite may result in a reduction in the activity of the ultimately formed hydrocracking catalyst composition.

In embodiments, the TiZr-USY zeolite may have a specific surface area after rare earth doping from 600 $m^2/g$ to 900 $m^2/g$. For example, the specific surface area of the TiZr-USY may be from 600 $m^2/g$ to 890 $m^2/g$, from 600 $m^2/g$ to 880 $m^2/g$, from 600 $m^2/g$ to 870 $m^2/g$, from 600 $m^2/g$ to 860 $m^2/g$, from 600 $m^2/g$ to 850 $m^2/g$, from 600 $m^2/g$ to 840 $m^2/g$, from 600 $m^2/g$ to 830 $m^2/g$, from 600 $m^2/g$ to 820 $m^2/g$, from 600 $m^2/g$ to 810 $m^2/g$, from 600 $m^2/g$ to 800 $m^2/g$, from 610 $m^2/g$ to 900 $m^2/g$, from 620 $m^2/g$ to 900 $m^2/g$, from 630 $m^2/g$ to 900 $m^2/g$, from 640 $m^2/g$ to 900 $m^2/g$, from 650 $m^2/g$ to 900 $m^2/g$, from 660 $m^2/g$ to 900 $m^2/g$, from 670 $m^2/g$ to 900 $m^2/g$, from 680 $m^2/g$ to 900 $m^2/g$, from 690 $m^2/g$ to 900 $m^2/g$, or even from 700 $m^2/g$ to 900 $m^2/g$. It should be understood that the specific surface area of the TiZr-USY zeolite may be in a range formed from any one of the lower bounds for such specific surface area described herein to any one of the upper bounds for such specific surface area described herein. Without intending to be bound by any particular theory, it is believed that a specific surface area of the TiZr-USY zeolite of less than 600 $m^2/g$ may result in a reduction in the number of available solid acid sites, thereby reducing the catalyst activity of the resulting hydrocracking catalyst composition to an unsatisfactory level.

In embodiments, the catalyst composition comprising the TiZr-USY zeolite may have a specific surface area from 200 $m^2/g$ to 450 $m^2/g$. For example, the specific surface area of the catalyst composition comprising the TiZr-USY zeolite may be from 210 $m^2/g$ to 450 $m^2/g$, from 220 $m^2/g$ to 450 $m^2/g$, from 230 $m^2/g$ to 450 $m^2/g$, from 240 $m^2/g$ to 450 $m^2/g$, from 250 $m^2/g$ to 450 $m^2/g$, from 200 $m^2/g$ to 440 $m^2/g$, from 200 $m^2/g$ to 430 $m^2/g$, from 200 $m^2/g$ to 420 $m^2/g$, from 200 $m^2/g$ to 410 $m^2/g$, or even from 200 $m^2/g$ to 400 $m^2/g$. It should be understood that the specific surface area of the catalyst composition comprising the TiZr-USY zeolite may be in a range formed from any one of the lower bounds for such specific surface area described herein to any one of the upper bounds for such specific surface area described herein. Without intending to be bound by any particular theory, it is believed that the hydrocracking rate is reduced when the specific surface area is less than 200 $m^2/g$, and the yield of the middle distillate is reduced. If, however, the specific surface area exceeds 450 $m^2/g$, the hydrocracking rate may grow too high, and the product selectivity may be changed unfavorably.

In embodiments, the TiZr-USY zeolite may have a molar ratio of $SiO_2$ to $Al_2O_3$ from 20 to 100. For example, the TiZr-USY zeolite may have a molar ratio of $SiO_2$ to $Al_2O_3$ from 20 to 99, from 20 to 98, from 20 to 97, from 20 to 96, from 20 to 95, from 20 to 94, from 20 to 93, from 20 to 92, from 20 to 91, from 20 to 90, from 20 to 89, from 20 to 88, from 20 to 87, from 20 to 86, from 20 to 85, from 20 to 84, from 20 to 83, from 20 to 82, from 20 to 81, from 20 to 80, from 21 to 100, from 22 to 100, from 23 to 100, from 24 to 100, or even from 25 to 100. It should be understood that the ratio of $SiO_2$ to $Al_2O_3$ of the TiZr-USY zeolite may be in a range formed from any one of the lower bounds for such ratio described herein to any one of the upper bounds for such ratio described herein.

Without intending to be bound by any particular theory, it is believed that a silica-alumina molar ratio of the TiZr-USY zeolite of less than 20 may have high acidic sites possessing high acid strength and is thus liable to cause a reduction in activity in hydrogenation and hydrocracking of the ultimately formed hydrocracking catalyst. Additionally, a larger alumina content is associated with lower stability of the TiZr-USY. Conversely, a silica-alumina ratio of the TiZr-USY zeolite exceeding 100 may result in a reduction in hydrocracking activity in a decomposition reactor of the ultimately prepared hydrocracking catalyst because of a small number of solid acid sites effective for a hydrocracking.

In embodiments, the catalyst composition comprising the TiZr-USY zeolite may include a plurality of pores having a diameter of 600 Å or less. These pores having a diameter of 600 Å or less have a volume from 0.4 ml/g to 0.75 ml/g. For example the pore volume may be in the range from 0.4 ml/g to 0.74 ml/g, from 0.4 ml/g to 0.73 ml/g, from 0.4 ml/g to 0.72 ml/g, from 0.4 ml/g to 0.71 ml/g, from 0.4 ml/g to 0.7 ml/g, from 0.4 ml/g to 0.69 ml/g, from 0.4 ml/g to 0.68 ml/g, from 0.4 ml/g to 0.67 ml/g, from 0.4 ml/g to 0.66 ml/g, from 0.4 ml/g to 0.65 ml/g, from 0.41 ml/g to 0.75 ml/g, from 0.42 ml/g to 0.75 ml/g, from 0.43 ml/g to 0.75 ml/g, from 0.44 ml/g to 0.75 ml/g, from 0.45 ml/g to 0.75 ml/g, from 0.46 ml/g to 0.75 ml/g, from 0.47 ml/g to 0.75 ml/g, from 0.48 ml/g to 0.75 ml/g, from 0.49 ml/g to 0.75 ml/g, or even from 0.5 ml/g to 0.75 ml/g. It should be understood that the pore volume of pores of the catalyst composition comprising the TiZr-USY zeolite having a diameter of 600 Å or less may be in a range formed from any one of the lower bounds for such pore volume described herein to any one of the upper bounds for such pore volume described herein.

Without intending to be bound by any particular theory, it is believed that the specific surface area is reduced if the pore volume is less than 0.40 ml/g. As a result, the hydrocracking catalyst activity and yield of the middle distillate are reduced. Conversely, if the pore volume exceeds 0.75 ml/g, the specific surface area is elevated. As a result, the hydrocracking rate and the product selectivity may be changed unfavorably.

The TiZr-USY zeolite includes at least one rare earth element (also referred to herein as "rare earth metals"). The rare earth metals include the fifteen lanthanides plus scandium and yttrium. Thus, the TiZr-USY zeolite may include one or more of scandium, yttrium, lanthanum, cerium, praseodymium, neodymium, promethium, samarium, europium, gadolinium, terbium, dysprosium, holmium, erbium, thulium, ytterbium, lutetium. In embodiments, the rare earth element is selected from the group consisting of lanthanum, scandium, yttrium, and a combination of two more thereof.

Without intending to be bound by any particular theory, it is believed that the rare earth metals increase acid sites and acid strength of the TiZr-USY zeolites. As a result, a catalyst composition comprising the rare earth doped TiZr-USY zeolites exhibit enhanced naphtha selectivity during hydrocracking processes, with less kerosene and gas oil produced, relative to catalyst compositions comprising non-rare earth doped TiZr-USY zeolites. Further, the catalyst compositions comprising the rare earth doped TiZr-USY zeolites have a hydrocracking activity that is similar to that of the analogous catalyst compositions comprising TiZr-USY zeolites without rare earth dopants.

In embodiments, the catalyst composition may include other additives. For instance, the catalyst composition may include one or more inorganic oxides in addition to the zeolites described above. The inorganic oxides may act as a granulating agent or a binder. Exemplary inorganic oxides include, but are not limited to, alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

In embodiments, the one or more inorganic oxide may be a component of the catalyst support. In embodiments having both a TiZr-USY zeolite and an inorganic oxide, the TiZr-USY zeolite present may comprise from 1 wt.° to 90 wt. %, from 1 wt.° to 85 wt. %, from 1 wt.° to 80 wt. %, from 10 wt. % to 75 wt. %, from 20 wt. % to 70 wt. %, or even from 30 wt. % to 60 wt. % of the support. In such embodiments, the inorganic oxide content may comprise from 99 wt. % to 10 wt. %, from 99 wt. % to 15 wt. %, from 99 wt. % to 20 wt. %, from 90 wt. % to 25 wt. %, from 80 wt. % to 30 wt. %, or even from 70 wt. % to 40 wt. % of the support. It should be understood that the TiZr-USY zeolite may be present in a range formed from any one of the lower bounds for such concentration described herein to any one of the upper bounds for such concentration described herein. It should be further understood that the inorganic oxide may be present in a range formed from any one of the lower bounds for such concentration described herein to any one of the upper bounds for such concentration described herein. Without intending to be bound by any particular theory, it is believed that the catalyst may not have sufficient mechanical strength if the inorganic oxide content falls below 10 wt. %. Further, it is believed that the catalyst may not have sufficient cracking capabilities if the zeolite content falls below 1 wt. %.

In embodiments, the hydrogenative metal component may comprise a known metal component for use in conventional hydrocracking catalysts. Examples thereof include, but are not limited to, metal components (iron, cobalt, nickel, rhodium, palladium, silver, iridium, platinum or gold) in group 8 of the long periodic table and/or metal components (chromium, molybdenum or tungsten) in group 6. For example, the hydrogenative metal component may include metal components of the platinum group (platinum, rhodium, palladium and the like) or combinations of molybdenum or tungsten in group 6 and cobalt or nickel in group 8.

In another aspect, a method of making a catalyst composition may include heating a USY zeolite in an oven having a temperature from 500° C. to 700° C., producing a suspension of the calcined USY zeolite at a pH of less than 2.0, mixing a zirconium compound and a titanium compound with the USY zeolite, neutralizing the resulting suspension to produce a TiZr-USY zeolite, and adding at least one rare earth element to the TiZr-USY zeolite. The resulting catalyst composition is as described above.

A detailed method of preparing the TiZr-USY zeolite is provided in U.S. Pat. No. 10,293,332, the entire content of which is incorporated herein by reference. An ultrastable Y-type zeolite is first calcined at 500° C. to 700° C., for instance at 550° C. to 650° C. for 30 minutes to 10 hours. If the calcining temperature of the ultra-stable Y-type zeolite is lower than 500° C., a lower quantity of zirconium atoms and titanium atoms tends to be incorporated when carrying out framework substitution treatment in subsequent steps relative to processes where calcining is carried out at 500° C. to 700° C. However, if the calcining temperature exceeds 700° C., the specific surface area of the ultra-stable Y-type zeolite may be lowered, and a lower quantity of zirconium atoms and titanium atoms tends to be incorporated when carrying out framework substitution treatment in subsequent steps relative to processes where calcining is carried out at 500° C. to 700° C. Calcining may take place in various atmospheres including, but not limited to, air.

The calcined ultra-stable Y-type zeolite may then be suspended in water having a temperature of about 20° C. to about 30° C. to form a suspension. The liquid/solid mass ratio for this suspension may be in the range of 5 to 15. For example, the liquid/solid mass ratio may be 8 to 12.

Next, an inorganic acid or an organic acid may be added to the suspension to give an acidified suspension. Exemplary acids include, but are not limited to, sulfuric acid, nitric acid, hydrochloric acid, carboxylic acids, and mixtures of two or more thereof. Advantageously, the acid may be used to adjust the pH of the suspension to less than 2, e.g. from 1 to 2. It has been observed that a pH in the above range may prevent precipitation upon mixing an aqueous solution of the zirconium compound and an aqueous solution of the titanium compound with the suspension for the framework substitution treatment discussed further below.

A solution containing a zirconium compound and/or a titanium compound may be added to the acidified suspension and mixed. The addition of the zirconium compound and the titanium compound may be performed gradually, for instance by dropwise addition. The mixing may take place at room temperature, i.e., from about 25° C. to about 35° C., for from three to five hours. Then, the mixed solution may be neutralized to a pH of 7 to 7.5 by adding a base and dried at 80° C. to 180° C., resulting in the TiZr-USY zeolite in which zirconium and titanium atoms form a part of the zeolite framework by replacing aluminum atoms that were previously part of the zeolite framework. Exemplary bases include, but are not limited to, aqueous ammonia.

In embodiments, exemplary zirconium compounds include, but are not limited to, zirconium sulfate, zirconium nitrate, zirconium chloride, and combinations of two or more thereof. In embodiments, the amount of the zirconium compound added may be from 0.1% to 5% by mass on a zirconium oxide basis with respect to the mass of the USY zeolite used. For example, from 0.2% to 4% by mass zirconium compound may be added. The addition of the zirconium compound in an amount of less than 0.1% by mass fails to achieve the desired USY zeolite properties. The addition of the zirconium compound in an amount exceeding 5% by mass may cause clogging of pores of the zeolite. In embodiments, an aqueous solution of a zirconium compound prepared by dissolving the zirconium compound in water may be used as the zirconium compound.

In embodiments, exemplary titanium compounds include, but are not limited to, titanium sulfate, titanium acetate, titanium chloride, titanium nitrate, titanium lactate, and combinations of two or more thereof. In embodiments, the amount of titanium compound added may be from 0.1% to 5% by mass on a titanium oxide basis with respect to the mass of the USY zeolite used. For example, from 0.2% to 4% by mass titanium compound may be added. The addition of the titanium compound in an amount of less than 0.1% by mass fails to achieve the desired USY zeolite properties. The addition of the titanium compound in an amount exceeding 5% by mass may cause clogging of pores of the zeolite. In embodiments, an aqueous solution of a titanium compound prepared by dissolving the titanium compound in water may be used as the titanium compound.

A TiZr-USY zeolite prepared as described above may then be doped with a rare earth salt using ion exchange in an aqueous solution. Exemplary rare earth salts include, but are not limited to, salts of rare earth metals in the +3 oxidation state, such as rare earth chlorides, rare earth nitrates, and rare earth acetates; salts of rare earth metals in the +4 oxidation state, such as rare earth sulfates; and combinations of two or more thereof. The rare earth salt may be dispersed in an aqueous solution in a concentration from 1 wt. % to 10 wt. %. For example, the concentration of rare earth salt in the aqueous solution may range from 2 wt. % to 9 wt. %, from 3 wt. % to 8 wt. %, from 4 wt. % to 7 wt. %, or even from 5 wt. % to 6 wt. %. It should be understood that the rare earth salt may be present in a concentration range formed from any one of the lower bounds for such concentration described herein to any one of the upper bounds for such concentration described herein. Ion exchange may be allowed to proceed from 25° C. to 70° C. for a period of time from 10 minutes to 4 hours.

In another aspect, a method for hydrocracking hydrocarbon oil includes contacting at least one hydrocarbon oil stream with at least one hydrocracking catalyst composition and hydrogen in a reactor in order to hydrocrack the hydrocarbon oil stream. The hydrocracking catalyst may be as described above. That is, the hydrocracking catalyst may include a catalyst support and at least one hydrogenative metal component disposed on the catalyst support. The catalyst support may include at least one TiZr-USY zeolite comprising at least one rare earth element.

The reactor may operate within a temperature range from 300° C. to 500° C. For example, the reactor may operate within a temperature range from 310° C. to 490° C., from 320° C. to 480° C., from 330° C. to 470° C., from 340° C. to 460° C., from 350° C. to 450° C., from 360° C. to 440° C., from 370° C. to 430° C., from 380° C. to 420° C., from 390° C. to 410° C., or even from 395° C. to 405° C. It should be understood that the reactor may operate within a temperature range formed from any one of the lower bounds of such temperature described herein and any one of the upper bounds of such temperature described herein.

The hydrocarbon oil may have a boiling point from 375° C. to 833° C. For example, the hydrocarbon oil may have a boiling point from 400° C. to 800° C., from 450° C. to 750° C., from 500° C. to 700° C., from 550° C. to 650° C., or even from 575° C. to 625° C. It should be understood that the hydrocarbon oil may have a boiling point within a temperature range formed from any one of the lower bounds of such temperature described herein and any one of the upper bounds of such temperature described herein.

Hydrogen may be used to produce saturated hydrocarbons during the hydrocracking process. The hydrogen may be added to the reactor at a pressure from 3.5 MPa to 35 MPa. For example, the hydrogen may be added to the reactor at a pressure from 4 MPa to 34.5 MPa, from 4.5 MPa to 34 MPa, from 5 MPa to 33.5 MPa, from 5.5 MPa to 33 MPa, from 6 MPa to 32.5 MPa, from 6.5 MPa to 32 MPa, from 7 MPa to 31.5 MPa, from 7.5 MPa to 31 MPa, from 8 MPa to 30.5 MPa, from 8.5 MPa to 30 MPa, from 9 MPa to 29.5 MPa, from 9.5 MPa to 29 MPa, from 10 MPa to 28.5 MPa, from 10.5 MPa to 28 MPa, from 11 MPa to 27.5 MPa, from 11.5 MPa to 27 MPa, from 12 MPa to 26.5 MPa, from 12.5 MPa to 26 MPa, from 13 MPa to 25.5 MPa, from 13.5 MPa to 25 MPa, from 14 MPa to 24.5 MPa, from 14.5 MPa to 24 MPa, from 15 MPa to 23.5 MPa, from 15.5 MPa to 23 MPa, from 16 MPa to 22.5 MPa, from 16.5 MPa to 22 MPa, from 17 MPa to 21.5 MPa, from 17.5 MPa to 21 MPa, from 18 MPa to 20.5 MPa, from 18.5 MPa to 20 MPa, or even from 19 MPa to 19.5 MPa. It should be understood that the hydrogen may be added to the reactor in a range of pressure from any one of the lower bounds of such pressure described herein to any one of the upper bounds of such pressure described herein. Without intending to be bound by any particular theory, it is believed that the process performance will be significantly reduced at lower hydrogen pressure. Conversely, it is believed that processes using high hydrogen pressure require specialized equipment that may significantly increase the cost of the process.

The hydrogen feed and hydrocarbon oil feeds may be adjusted such that the hydrogen/oil ratio in the reactor may be from 500 normal cubic meters per cubic meter (hereinafter "$Nm^3/m^3$") to 2500 $Nm^3/m^3$, with normal cubic meters being defined as the volume in cubic meters at standard temperature and pressure (15° C. and 0.1 MPa). For example, the hydrogen/oil ratio may be from 550 $Nm^3/m^3$ to 2450 $Nm^3/m^3$, from 600 $Nm^3/m^3$ to 2400 $Nm^3/m^3$, from 650 $Nm^3/m^3$ to 2350 $Nm^3/m^3$, from 700 $Nm^3/m^3$ to 2300 $Nm^3/m^3$, from 750 $Nm^3/m^3$ to 2250 $Nm^3/m^3$, from 800 $Nm^3/m^3$ to 2200 $Nm^3/m^3$, from 850 $Nm^3/m^3$ to 2150 $Nm^3/m^3$, from 900 $Nm^3/m^3$ to 2100 $Nm^3/m^3$, from 950 $Nm^3/m^3$ to 2050 $Nm^3/m^3$, from 1000 $Nm^3/m^3$ to 2000 $Nm^3/m^3$, from 1050 $Nm^3/m^3$ to 1950 $Nm^3/m^3$, from 1100 $Nm^3/m^3$ to 1900 $Nm^3/m^3$, from 1150 $Nm^3/m^3$ to 1850 $Nm^3/m^3$, from 1200 $Nm^3/m^3$ to 1800 $Nm^3/m^3$, from 1250 $Nm^3/m^3$ to 1750 $Nm^3/m^3$, from 1300 $Nm^3/m^3$ to 1700 $Nm^3/m^3$, from 1250 $Nm^3/m^3$ to 1650 $Nm^3/m^3$, from 1300 $Nm^3/m^3$ to 1500 $Nm^3/m^3$, or even from 1350 $Nm^3/m^3$ to 1450 $Nm^3/m^3$. It should be understood that the hydrogen/oil ratio may be in a range of ratios from any one of the lower bounds of such ratio described herein to any one of the upper bounds of such ratio described herein. Without intending to be bound by any particular theory, it is believed that the process performance will be significantly reduced at a lower hydrogen/oil ratio. Conversely, it is believed that processes using a high hydrogen/oil ratio require specialized equipment that may significantly increase the cost of the process and may increase the gas holdup in the system thereby decreasing process performance.

The liquid hourly space velocity (hereinafter "LHSV") of the hydrocarbon feed in the reactor may be from 0.1 per hour to 10 per hour. For example, the liquid hourly space velocity may be from 0.5 per hour to 9.5 per hour, from 1 per hour to 9 per hour, from 1.5 per hour to 8.5 per hour, from 2 per hour to 8 per hour, from 2.5 per hour to 7.5 per hour, from 3 per hour to 7 per hour, from 3.5 per hour to 6.5 per hour, from 4 per hour to 6 per hour, or even from 4.5 per hour to 5.5 per hour. It should be understood that the LHSV may be in a range formed from any one of the lower bounds for the LHSV described herein to any one of the upper bounds for the LHSV described herein.

As noted above, the method for hydrocracking may take place in one or more reactors. Flow reactors are well-suited for this process, although the subject matter described herein is not so limited. Exemplary flow reactors include, but are not limited to, a stirred tank reactor, an ebullated bed reactor, a baffled slurry tank, a fixed bed reactor, a rotating tubular reactor, a slurry-bed reactor, a moving-bed reactor, and a combination of two or more of these.

According to an aspect, either alone or in combination with any other aspect, a catalyst composition includes a catalyst support comprising at least one framework-substituted USY zeolite and at least one hydrogenative component disposed on the catalyst support. The framework-substituted USY zeolite is substituted with zirconium atoms and titanium atoms and comprises at least one rare earth element.

According to a second aspect, either alone or in combination with any other aspect, the at least one framework-substituted USY zeolite is substituted with 0.1 wt. % to 5 wt. % zirconium atoms and 0.1 wt. % to 5 wt. % titanium calculated on an oxide basis.

According to a third aspect, either alone or in combination with any other aspect, the rare earth element is selected from the group consisting of scandium, yttrium, lanthanum, cerium, praseodymium, neodymium, promethium, samarium, europium, gadolinium, terbium, dysprosium, holmium, erbium, thulium, ytterbium, lutetium, and a combination of two more thereof.

According to a fourth aspect, either alone or in combination with any other aspect, the framework-substituted USY zeolite comprises a crystal lattice constant from 2.43 nm to 2.45 nm.

According to a fifth aspect, either alone or in combination with any other aspect, the framework-substituted USY zeolite comprises a specific surface area from 600 m$^2$/g to 900 m$^2$/g.

According to a sixth aspect, either alone or in combination with any other aspect, the catalyst composition comprises a specific surface area from 200 m$^2$/g to 450 m$^2$/g.

According to a seventh aspect, either alone or in combination with any other aspect, the framework-substituted USY zeolite comprises a molar ratio of $SiO_2$ to $Al_2O_3$ from 20 to 100.

According to an eighth aspect, either alone or in combination with any other aspect, the catalyst composition comprises a plurality of pores having a diameter of 600 Å or less, the pores having a volume from 0.4 ml/g to 0.75 ml/g.

According to a ninth aspect, either alone or in combination with any other aspect, the at least one hydrogenative component comprises from 0.01 wt. % to 40 wt. % of the catalyst composition.

According to a tenth aspect, either alone or in combination with any other aspect, the at least one hydrogenative component comprises iron, cobalt, nickel, rhodium, palladium, silver, iridium, platinum, gold, chromium, molybdenum, tungsten, or a combination of two or more thereof.

According to an eleventh aspect, either alone or in combination with any other aspect, a method of making a catalyst composition includes heating an ultra-stable Y-type (USY) zeolite in an oven having a temperature from 500° C. to 700° C.; mixing a zirconium compound and a titanium compound with the ultra-stable Y-type (USY) zeolite to produce a framework-substituted USY zeolite; and incorporating a rare earth element into the framework-substituted USY zeolite.

According to a twelfth aspect, either alone or in combination with any other aspect, the USY zeolite has a crystal lattice constant from 2.43 nm to 2.45 nm in the method.

According to a thirteenth aspect, either alone or in combination with any other aspect, the framework-substituted USY zeolite comprises a specific surface area from 600 m$^2$/g to 900 m$^2$/g in the method.

According to a fourteenth aspect, either alone or in combination with any other aspect, the framework-substituted USY zeolite comprises a molar ratio of $SiO_2$ to $Al_2O_3$ from 20 to 100 in the method.

According to a fifteenth aspect, either alone or in combination with any other aspect, the mixing comprises forming a suspension containing the USY zeolite, the suspension having a liquid/solid mass ratio from 5 to 15 and adding inorganic acid or organic acid.

According to a sixteenth aspect, either alone or in combination with any other aspect, the suspension has a pH less than or equal to 2 after the adding the inorganic acid or the organic acid in the method.

According to a seventeenth aspect, either alone or in combination with any other aspect, the rare earth element is selected from the group consisting of scandium, yttrium, lanthanum, cerium, praseodymium, neodymium, promethium, samarium, europium, gadolinium, terbium, dysprosium, holmium, erbium, thulium, ytterbium, lutetium, and a combination of two more thereof in the method.

According to an eighteenth aspect, either alone or in combination with any other aspect, the at least one hydrogenative component is added such that the at least one hydrogenative component comprises from 0.01 wt. % to 40 wt. % of the catalyst composition in the method.

According to a nineteenth aspect, either alone or in combination with any other aspect, the method further comprises mixing a binder with the framework substituted USY zeolite having the rare earth element, the binder selected from the group consisting of alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, and a combination of two more thereof.

According to a twentieth aspect, either alone or in combination with any other aspect, a method for hydrocracking hydrocarbon oil includes contacting at least one hydrocarbon oil stream with at least one hydrocracking catalyst composition and hydrogen in a reactor in order to hydrocrack the hydrocarbon oil stream. The catalyst composition includes a catalyst support comprising at least one framework-substituted USY zeolite and at least one hydrogenative component disposed on the catalyst support. The framework-substituted USY zeolite is substituted with zirconium atoms and titanium atoms and comprises at least one rare earth element.

According to a twenty-first aspect, either alone or in combination with any other aspect, the reactor has a temperature from 300° C. to 500° C.

According to a twenty-second aspect, either alone or in combination with any other aspect, the hydrocarbon oil has a boiling point from 375° C. to 833° C.

According to a twenty-third aspect, either alone or in combination with any other aspect, the hydrogen is added to the reactor at a pressure from 3.5 MPa to 35 MPa.

According to a twenty-fourth aspect, either alone or in combination with any other aspect, the reactor has a hydrogen/oil ratio from 500 Nm$^3$/m$^3$ to 2500 Nm$^3$/m$^3$.

According to a twenty-fifth aspect, either alone or in combination with any other aspect, the reactor has a liquid hourly space velocity from 0.1 per hour to 10 per hour.

According to a twenty-sixth aspect, either alone or in combination with any other aspect, the reactor comprises a flow reactor selected from the group consisting of a stirred tank reactor, an ebullated bed reactor, a baffled slurry tank, a fixed bed reactor, a moving bed reactor, a rotating tubular reactor, a slurry-bed reactor, and a combination of two or more of these.

EXAMPLES

Using embodiments described above, an exemplary catalyst composition was prepared and characterized, as follows.

Synthesis of TiZr-USY

A TiZr-USY zeolite was prepared as described in U.S. Pat. No. 10,293,332, the entire content of which is incorporated herein by reference.

A Y-type zeolite (Na-Y) is subjected to exchange of sodium ions with ammonium ions by a conventional method. In one exemplary method, the Y-type zeolite is dispersed in water to prepare a suspension, to which ammonium sulfate is added. The solid matter is then washed with water, followed by an ammonium sulfate aqueous solution of a temperature of 40° C. to 80° C. Then, the solid is further washed with water at 40° to 95° C. and dried at 100° C. to 180° C. for 30 minutes, thus producing an ammonium-exchanged Y-type zeolite in which 50% to 70% of sodium contained in the Y-type zeolite is substituted with $NH_4$.

Subsequently, a hydrogen type Y-type zeolite (HY) is prepared by calcining the above ammonium-exchanged Y-type zeolite at 500° C. to 800° C. for 10 minutes to 10 hours in a saturated vapor atmosphere. Then, an ammonium-exchanged Y-type zeolite in which 80% to 97% of sodium contained in the initial Y-type zeolite (Na-Y) is ion-exchanged with $NH_4$ can be obtained by dispersing the hydrogen type Y-type zeolite obtained above in water at 40° C. to 95° C. to prepare a suspension, to which ammonium sulfate is added. The suspension is stirred at 40° C. to 95° C. for 10 minutes to 3 hours. The solid matter is then washed with water at 40° C. to 95° C., followed by an ammonium sulfate aqueous solution at 40° C. to 95° C. Then, the solid is further washed with water at 40° C. to 80° C. and dried at 100° C. to 180° C. for 30 minutes to 30 hours. In this respect, the final ammonium ion exchange rate is at least 90%.

The ammonium-exchanged Y zeolite thus obtained is calcined at 500° C. to 700° C. for 10 minutes to 10 hours in, for example, a saturated vapor atmosphere, to provide an ultra-stable Y-type zeolite.

The ammonium-exchanged Y zeolite is then subjected to a treatment for removing extra-skeletal aluminum (aluminum atoms which do not form the zeolite framework). Extra-skeletal aluminum can be removed by, for example, dispersing the ultra-stable Y-type zeolite described above in warm water at 40° C. to 95° C. to prepare a suspension, adding sulfuric acid to the above suspension, and stirring the suspension for 10 minutes to 3 hours while maintaining the temperature at 40° C. to 95° C. to thereby dissolve the extra-skeletal aluminum. After dissolving the extra-skeletal aluminum, the suspension is filtered, and the filter residue is washed with purified water at 40° C. to 95° C. and dried at 100° C. to 180° C. for 3 to 30 hours. An ultra-stable Y-type zeolite from which the extra-skeletal aluminum is removed is thus obtained.

The ultra-stable Y-type zeolite from which the extra-skeletal aluminum is removed is calcined at 500° C. to 700° C. for 30 minutes to 10 hours. The calcined ultra-stable Y-type zeolite is suspended in water having a temperature of about 20° C. to about 30° C. to form a suspension with a liquid/solid mass ratio in the range of 5 to 15. Next, an inorganic acid or an organic acid is added so that a pH of the suspension is less than 2, and subsequently a solution containing a zirconium compound and a titanium compound is added gradually and mixed. The mixed solution is then neutralized (pH 7.0 to 7.5) and dried at 80° C. to 180° C., thus providing the TiZr-USY zeolite.

Synthesis of Rare Earth Doped TiZr-USY Zeolite

The TiZr-USY zeolite prepared above is subjected to ion exchange conditions. The TiZr-USY zeolite is added to an aqueous solution of 1 wt. % to 10 wt. % lanthanum chloride (calculated based on $La_2O_3$). This mixture is then heated to 50° C. to 70° C. for 10 minutes to 4 hours. The ion-exchanged USY zeolite is then washed with warm water at 50° C. to 70° C. and dried at 100° C. to 180° C. for 30 minutes to 30 hours, thus providing the rare earth doped TiZr-USY zeolite.

The rare earth doped TiZr-USY zeolite and a non-doped TiZr-USY zeolite were analyzed to determine their specific surface area (SA), silica-to-alumina ratio (SAR), and relative crystallinity, as well as the concentration of $TiO_2$, $ZrO_2$, and $La_2O_3$ present. SA may be determined as described above. Quantitative compositional analysis was determined by X-ray fluorescence spectroscopy (XRF) and the SAR, on a molar basis, was derived from the XRF data. The relative crystallinity was calculated from an X-ray diffraction peak of a sample (zeolite). The total height (H) of peaks from the (331), (511), (440), (533), (642), and (555) planes of a TiZr-USY zeolite measured by X-ray diffraction is determined. The total height (Ho) of peaks from the same planes of a commercially available Y zeolite (SK-40, manufactured by Union Carbide Corporation) is determined as a reference. The crystallinity is determined using the following formula (1):

$$\text{Crystallinity}(\%) = \frac{H}{H_0} \times 100$$

The results of these analyses are presented in Table 1.

TABLE 1

Characterization of the Rare Earth Doped TiZr-USY Zeolite and the Non-Doped TiZr-USY Zeolite

| Property | Rare Earth TiZr-USY | TiZr-USY (Non-Doped) |
|---|---|---|
| Specific Surface Area (m²/g) | 702 | 780 |
| Silica-to-Alumina Ratio | 40 | 40 |
| Relative Crystallinity | 0.96 | 1.06 |
| $TiO_2$ (wt. %) | 0.67 | 0.70 |
| $ZrO_2$ (wt. %) | 0.58 | 0.68 |
| $La_2O_3$ (wt. %) | 1.03 | 0 |

Formulation of Catalyst Compositions

Catalyst Composition 1 was formulated using 30 wt. % rare earth doped TiZr-USY zeolite and 70 wt. % alumina-only binder. Catalyst Composition 2 was formulated using 30 wt. % TiZr-USY zeolite without a rare earth dopant and 70 wt. % alumina-only binder. The combined TiZr-USY zeolite and binder are referred to as the "carrier." For purposes of specifying the concentrations of components of the Catalyst Compositions, the hydrogenative component, which for both Catalyst Composition 1 and Catalyst Composition 2 included nickel and molybdenum, were calculated as components of the carrier. The hydrogenative component is added to the carrier concentration to give a concentration with respect to the final catalyst composition (carrier+metals). For example, a catalyst composition containing 100 kg of carrier and 32 kg of hydrogenative components would have the hydrogenative components at 24 wt. % of the total catalyst composition.

Table 2 provides the compositional analyses of Catalyst Composition 1, and Catalyst Composition 2. Specific surface area and pore volume were determined as follows. Adsorption measuring equipment (e.g., fully automatic gas adsorption equipment "AUTOSORB-1" manufactured by Quantachrome Instruments Corp.) was used to subject 0.02 to 0.05 g of a sample (zeolite or the catalyst composition) to deaeration treatment at room temperature for 5 hours. An adsorption desorption isothermal curve was measured under liquid nitrogen temperature to calculate a specific surface area per mass using a BET equation of a multipoint method. Further, a pore distribution and a pore volume (pore diameter: 600 Å or less) were calculated from a nitrogen adsorption isothermal curve by a BJH method. Compacted bulk density may be determined as follows. The sample was pre-calcined at 500° C. for one hour. The sample was then cooled in a dessicator. A volumetric cylinder was charged with 100 g of the dried sample, which was tamped down. From the volume of the sample, the compacted bulk density was calculated as the weight of the sample divided by its volume.

TABLE 2

Characterization of Catalyst Compositions

| Property | Catalyst Composition 1 | Catalyst Composition 2 (Comparative) |
|---|---|---|
| $MoO_3$ (wt. %) | 17.1 | 16.1 |
| NiO (wt. %) | 4.2 | 3.9 |
| $TiO_2$ (wt. %) | 0.15 | 0.21 |
| $ZrO_2$ (wt. %) | 0.12 | 0.19 |
| $La_2O_3$ (wt. %) | 0.21 | 0 |
| Specific Surface Area ($m^2$/g) | 295 | 330 |
| Pore volume (ml/g) | 0.61 | 0.65 |
| Compacted Bulk Density (ml/g) | 0.67 | 0.65 |

Pilot Plant Hydrocracking Process

Catalyst Composition 1 and Catalyst Composition 2 were both used in a hydrocracking process with a vacuum gas oil (VGO) feed. The VGO had a density of 0.923 g/cm$^3$, a sulfur content of 2.51 wt. %, and a nitrogen content of 960 ppm. The naphtha fraction was considered to be the fraction from the C5 cut point, i.e., about 32° C., to 145° C. The kerosene fraction was considered to be the fraction from 145° C. to 260° C. The gasoil fraction was considered to be the fraction from 260° C. to 360° C. The middle distillate fractions were considered to be the fractions from 145° C. to 360° C. The unconverted bottoms fraction was considered to be any fraction above 360° C.

For the hydrocracking process, a pilot plant was loaded with 100 ml of a commercial pretreat catalyst followed by 100 ml of either the Catalyst Composition 1 or the Catalyst Composition 2. Hydrogen was added to the pilot plant at a partial pressure of 13.5 MPa with a hydrogen/oil ratio of 1000 Nm$^3$/m$^3$ and an LHSV of 0.5 per hour. Reactions were performed at 360° C., 375° C., 390° C., and 405° C., sequentially without cooling between increases.

Table 3 provides a measure of the catalytic activity of Catalyst Composition 1 and Catalyst Composition 2, expressed as the temperature at which 50 wt. % conversion was observed. Also, Table 3 provides the wt. % of various distillates obtained using each Catalyst Composition.

TABLE 3

Activity of Catalyst Compositions

| Parameter | Catalyst Composition 1 | Catalyst Composition 2 | Difference[1] |
|---|---|---|---|
| Temperature at 50 wt. % Conversion (° C.) | 380.3 | 380.4 | 0.1 |
| Gas (C1-C4, wt. %) | 1.3 | 1.3 | 0 |
| Naphtha (wt. %) | 7.1 | 5.6 | 1.5 |
| Kerosene (wt. %) | 24.5 | 26.1 | −1.6 |
| Gasoil (wt. %) | 24.2 | 24.1 | 0.1 |
| Middle Distillate (wt. %) | 48.7 | 50.2 | −1.5 |
| Unconverted Bottoms (wt. %) | 42.9 | 42.9 | 0 |
| Total (wt. %) | 100 | 100 | 0 |

[1]Catalyst Composition 1 value − Catalyst Composition 2 value.

The results show that Catalyst Composition 1, which includes the rare earth dopant, achieved 50% conversion at a temperature slightly below (0.1° C.) the temperature at which Catalyst Composition 2, which includes the non-doped TiZr-USY zeolite, achieved 50% conversion, all other variables being significantly similar. In addition, Catalyst Composition 1, which was doped with a rare earth metal, surprisingly produced the same amount of C1-C4 gases and significantly more (1.5 wt. %) naphtha at the expense of the middle distillates, particularly kerosene.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A catalyst composition comprising:
   a catalyst support comprising at least one framework-substituted ultra-stable Y-type (USY) zeolite substituted with zirconium atoms and titanium atoms, the at least one framework-substituted USY zeolite comprising at least one doped rare earth element; and
   at least one hydrogenative component disposed on the catalyst support.

2. The catalyst composition of claim 1, wherein the at least one framework-substituted USY zeolite is substituted with 0.1 wt. % to 5 wt. % zirconium atoms and 0.1 wt. % to 5 wt. % titanium calculated on an oxide basis.

3. The catalyst composition of claim 1, wherein the rare earth element is selected from the group consisting of scandium, yttrium, lanthanum, cerium, praseodymium, neodymium, promethium, samarium, europium, gadolinium, terbium, dysprosium, holmium, erbium, thulium, ytterbium, lutetium, and a combination of two more thereof.

4. The catalyst composition of claim 1, wherein the framework-substituted USY zeolite comprises a crystal lattice constant from 2.43 nm to 2.45 nm.

5. The catalyst composition of claim 1, wherein the framework-substituted USY zeolite comprises a specific surface area from 600 m$^2$/g to 900 m$^2$/g.

6. The catalyst composition of claim 1, wherein the catalyst composition comprises a specific surface area from 200 m$^2$/g to 450 m$^2$/g.

7. The catalyst composition of claim 1, wherein the framework-substituted USY zeolite comprises a molar ratio of SiO$_2$ to Al$_2$O$_3$ from 20 to 100.

8. The catalyst composition of claim 1, wherein the catalyst composition comprises a plurality of pores having a diameter of 600 Å or less, the pores having a volume from 0.4 ml/g to 0.75 ml/g.

9. The catalyst composition of claim 1, wherein the at least one hydrogenative component comprises from 0.01 wt. % to 40 wt. % of the catalyst composition.

10. The catalyst composition of claim 1, wherein the at least one hydrogenative component comprises iron, cobalt, nickel, rhodium, palladium, silver, iridium, platinum, gold, chromium, molybdenum, tungsten, or a combination of two or more thereof.

11. A method of making a catalyst composition, the method comprising:
    heating an ultra-stable Y-type (USY) zeolite in an oven having a temperature from 500° C. to 700° C.;
    mixing a zirconium compound and a titanium compound with the ultra-stable Y-type (USY) zeolite to produce a framework-substituted USY zeolite;
    incorporating a doped rare earth element into the framework-substituted USY zeolite to provide a rare-earth doped framework-substituted USY zeolite; and
    combining the rare-earth doped framework-substituted USY zeolite and at least one hydrogenative component to provide the catalyst composition.

12. The method of claim 11, wherein the mixing comprises forming a suspension containing the USY zeolite, the suspension having a liquid/solid mass ratio from 5 to 15 and adding inorganic acid or organic acid.

13. The method of claim 11, wherein the at least one hydrogenative component is added such that the at least one hydrogenative component comprises from 0.01 wt. % to 40 wt. % of the catalyst composition.

14. The method of claim 11, further comprising mixing a binder with the framework substituted USY zeolite having the rare earth element, the binder selected from the group consisting of alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, and a combination of two more thereof.

15. A method for hydrocracking hydrocarbon oil, comprising:
    contacting at least one hydrocarbon oil stream with at least one hydrocracking catalyst composition and hydrogen in a reactor in order to hydrocrack the hydrocarbon oil stream, the hydrocracking catalyst composition comprising:
    a catalyst support comprising at least one framework-substituted ultra-stable Y-type (USY) zeolite substituted with zirconium atoms and titanium atoms, the at least one framework-substituted USY zeolite comprising at least one doped rare earth element; and
    at least one hydrogenative component disposed on the catalyst support.

16. The method of claim 15, wherein the reactor has a temperature from 300° C. to 500° C.

17. The method of claim 15, wherein the hydrocarbon oil has a boiling point from 375° C. to 833° C.

18. The method of claim 15, wherein the hydrogen is added to the reactor at a pressure from 3.5 MPa to 35 MPa.

19. The method of claim 15, wherein the reactor has a hydrogen/oil ratio from 500 Nm$^3$/m$^3$ to 2500 Nm$^3$/m$^3$.

20. The method of claim 15, wherein the reactor has a liquid hourly space velocity from 0.1 per hour to 10 per hour.

* * * * *